Feb. 21, 1956   E. P. BARRETT   2,735,823
BASIC CALCIUM PHOSPHATE COMPOSITION
Filed Nov. 15, 1951   2 Sheets-Sheet 1

PORE VOLUME DISTRIBUTION CURVES FOR THREE ABSORBENTS

INVENTOR.
ELLIOTT P. BARRETT
BY
HIS ATTORNEYS

CUMULATIVE PORE AREA CURVES FOR THREE ABSORBENTS

INVENTOR.
ELLIOTT P. BARRETT

HIS ATTORNEYS

# United States Patent Office 2,735,823
Patented Feb. 21, 1956

2,735,823

BASIC CALCIUM PHOSPHATE COMPOSITION

Elliott P. Barrett, Baltimore, Md., assignor to Baugh and Sons Company, Baltimore, Md., a corporation of Pennsylvania Application November 15, 1951, Serial No. 256,428

15 Claims. (Cl. 252—423)

This invention relates to improved basic calcium phosphate adsorbents and catalysts, and to methods of making them.

Figure 1:
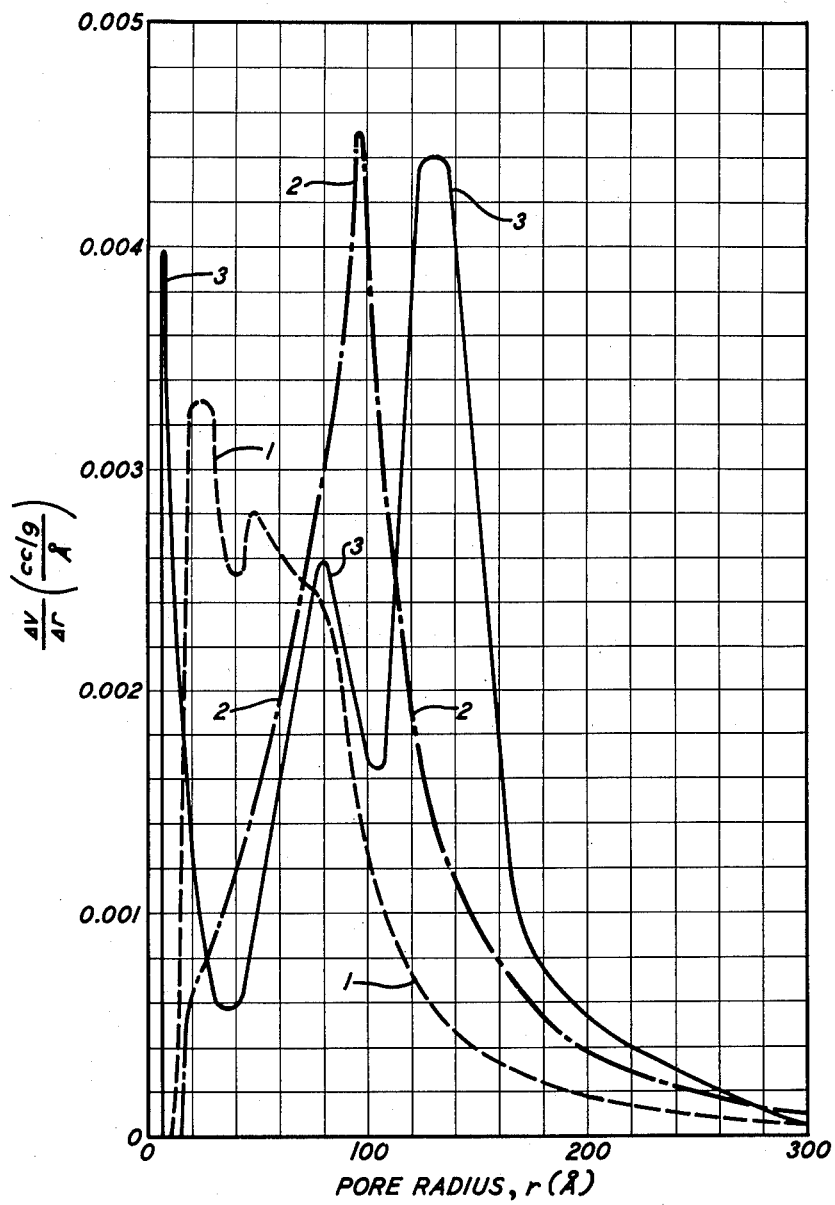
Figure 2:
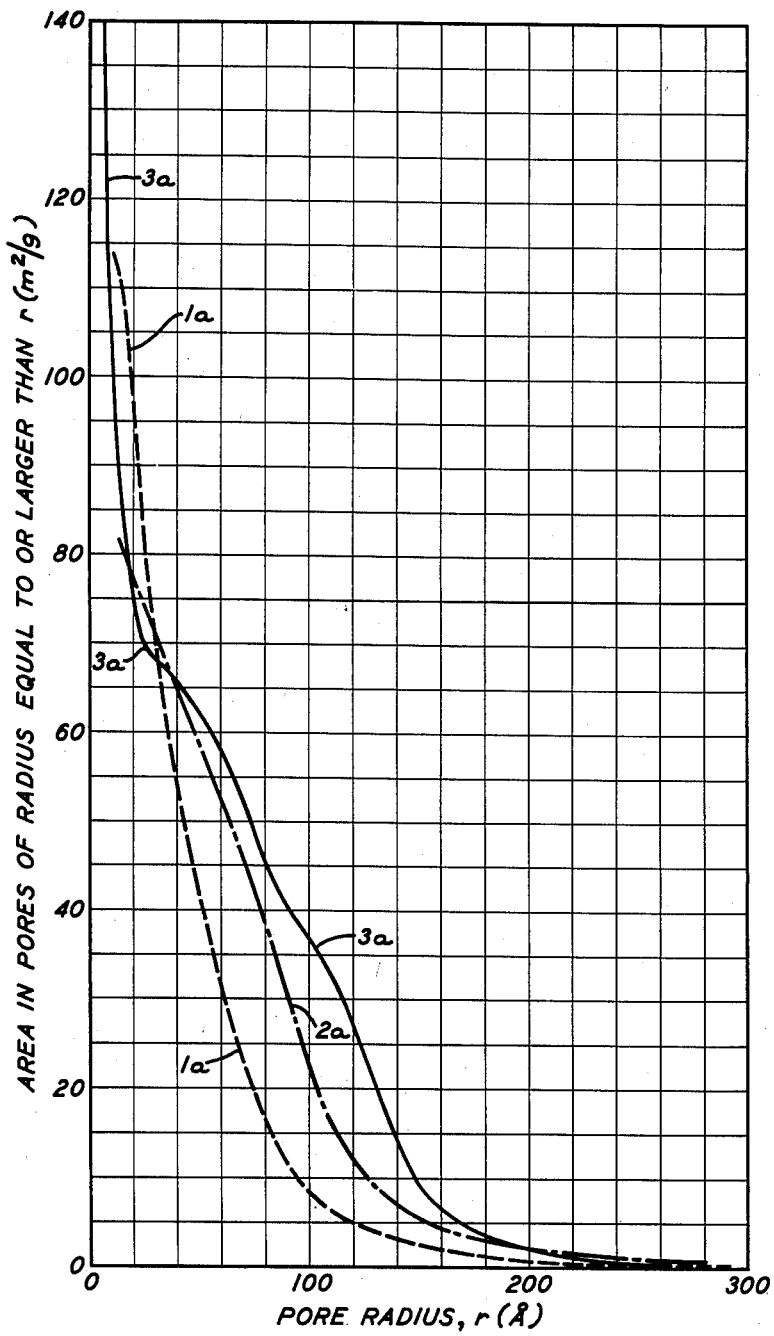

The invention will be described with reference to the accompanying drawings in which the graphs of Fig. 1 represent the distribution of pore volume with respect to pore radius for a new bone char, a basic calcium phosphate adsorbent composition of the prior art, and a basic calcium phosphate adsorbent composition according to this invention; and Fig. 2 represents cumulative pore area graphs for the same three adsorbents, the pore radius $r$ in Angstrom units being plotted against the area in square meters per gram for pores of radius equal to or greater than $r$.

The activity of adsorbents and catalysts is in general related to their effective area per unit weight. If all other properties of such a material are kept constant and the area per unit weight is decreased its activity is, as a general rule, likewise decreased and, conversely, increase in the area per unit weight generally produces increased activity. For brevity, area per unit weight will hereinafter be called simply area. Consequently, the production and maintenance of large areas is of primary importance in the manufacture and use of adsorbents and catalysts.

For the production of large areas two general procedures are available. According to one of these the material is produced in or reduced to very small particle sizes. The second procedure involves rendering the particles porous by various processes that have been applied in the past such, for example, as those used for the production of activated carbons. The latter procedure is the more effective because in general by the development of porosity the area of a particle internal to its apparent geometrical boundary can be made many times greater than that of the external surface. However, an increase of area by development of porosity involves the question of the availability of some or all of the increased area because if the pores produced are so small that the molecules of the material being treated can not enter them, or if they are so small as to be easily clogged, the increased area is functionless.

Pore size is of critical importance in those instances where a porous solid is to be used and reactivated many times and in the course of each such cycle foreign matter enters the pores and is incompletely removed in the reactivation process. Such residual foreign matter obviously reduces the cross-sectional area of pores and successive cycles of use and reactivation cause progressive reduction until the wall area of the pore is reduced nearly to zero or the pore becomes so small that its surface is no longer available for its intended purpose.

A particular example of a process in which a porous solid is used and regenerated many times as an adsorbent is in the refining of cane sugar. As generally practiced, this operation consists, in part, in the filtration of sugar liquors of varying purity through vertical columns of granular bone char which functions to remove colored impurities, ash-forming mineral matter, and other non-sugar substances from the liquor. When the efficiency of the char has diminished to a predetermined extent the flow of sugar liquor to the filter is discontinued and water is applied to the top of the filter to wash out the residual sugar liquor. When the sugar has been washed from the char as completely as is practical washing is continued, with passage of the effluent wash water to the sewer, to remove adsorbed impurities from the char. This latter washing phase is a protracted process, and practical considerations dictate that it be terminated at a point where appreciable amounts of impurities remain in the char. After air blowing as much residual water as is practical from the char, the char is passed to driers and then to reburning kilns where it is regenerated by heating in the substantial absence of air. In this reburning the residual ash-forming material becomes sintered to the pore walls while residual organic matter is carbonized with deposition of carbon on the pore walls. In consequence the size of the pores is reduced appreciably, as has been demonstrated by measurments of total pore volume and area.

In all such instances of cyclic use and regeneration of adsorbents and catalysts it is obvious that the smaller pores will become more quickly clogged by the deposition of foreign matter than will large ones. Consequently, it would be advantageous to supply such materials with the largest pores consistent with adequate area. This may be illustrated by reference to natural bone char such as is used for sugar refining and which, despite the fact that it has been used for a great many years in sugar refineries to the practical exclusion of all other materials, is not a particularly satisfactory adsorbent from the viewpoint of pore size distribution. Moreover, although bone char satisfactorily refines sugar up to the time its efficiency becomes too low, it lacks uniformity owing to the fact that it is made from raw material of variable and uncontrollable uniformity.

Having reference to Fig. 1, the graph 1 represents the distribution of pore volume with respect to pore radius for a new bone char of the quality used by sugar refineries. It will be seen that the curve is bimodal with a major mode at about 25 Angstrom (A.) pore radius and a minor one at about 50 A. Thus this char when placed in service has a considerable volume in pores of 10 to 30 A. radius above which the pore volume per Angstrom drops sharply to a minimum at about 40 A. radius and then rises to a second maximum at about 50 A. after which the pore volume falls off rapidly to a very small volume at 300 A. radius It thus appears that the preponderance of pore volume in a new bone char is supplied by pores of less than about 80 A. radius, with a lesser proportion of the volume represented by pores of larger radius. In consequence, the tendency will be for the effective, or operative, area to be reduced more rapidly than is desirable through deposition of carbon and ash in the pores of smaller radius during the regeneration steps. It follows that, as indicated above, a more satisfactory adsorbent would be provided if a greater proportion of the pore volume were supplied by pores of greater radius, e. g., 100 A. or larger.

Data such as are embodied in the graphs of Fig. 1 may be obtained in various ways. The total pore volume of any porous solid is measurable by a number of well-known procedures all of which depend upon filling the pores with a suitable fluid under conditions which permit measurement of the volume required to fill them. Helium, nitrogen and water are commonly used for this purpose. If both volume and area of the pores of a solid are known, an estimate of the average radius of the pores can be made by assuming them to be cylindrical since the area of the wall of a cylinder is related to its volume by the equation $r=2V/a$ where $r$ is the pore radius, $V$ its volume and $a$ its area. The area of the pore walls can be estimated from the low temperature nitrogen adsorption isotherm for the substance by the method of Brunauer, Emmett and Teller, 60 JACS 309 (1938), and the word "area" as used herein designates the surface available to nitrogen as determined by that method.

The distribution of pore volume and area with respect to pore radius can be determined by the method described by Barrett and Joyner, 73 JACS, 373 (1951). This depends upon computation of the volume of pores of various radii from the low temperature nitrogen desorption isotherm for the substance by the means of the Kelvin equation relating the vapor pressure depression of a liquid in a capillary to the radius of curvature of the liquid meniscus, and applying appropriate corrections for the physical adsorption of nitrogen which occurs regardless of the pore sizes. It is this method that was used in acquiring the data for the graphs of the accompanying drawings.

The inorganic portion of bone char, which is the portion primarily effective in determining the distribution of volume among pores of various sizes, is an hydroxyapatite which, chemically, possesses desirable properties as a sugar refining adsorbent and as a catalyst for certain organic reactions such, for example, as the hydrolysis of chlorinated hydrocarbons to the corresponding hydroxy compounds, e. g., the conversion of chlorbenzene to phenol.

Patent No. 2,352,932 to James R. West and the present applicant disclosed a synthetic adsorbent adapted to serve as a substitute for natural bone char, and a method of making it. Briefly, a basic calcium phosphate at least as alkaline as hydroxyapatite [$Ca_3(PO_4)_2 \cdot \frac{1}{3}Ca(OH)_2$] is formed in contact with clay and a carbonizable material under such conditions as to produce a homogenous mixture of the three. According to the patented invention that is accomplished by reacting a calcium compound, such as lime, and phosphoric acid or other reactive phosphate in a suspension of the clay and carbonizable material, such as starch, in an alkaline aqueous medium, whereby the basic calcium phosphate is formed in contact with and deposited on the clay and starch. The solid products are recovered by filtration and then dried and heated to effect carbonization of the carbonizable material and hardening through the bonding action of the clay.

In a copending application filed by the present applicant and Richard A. Finkel December 3, 1947, Serial No. 789,488, now abandoned, there is disclosed an improvement upon the invention of the foregoing patent. It is predicted upon the discovery that it is unnecessary to form the basic calcium phosphate in contact with clay and carbonizable matter provided the basic calcium phosphate prior to hardening be subjected to thorough mixing and high intensity shearing stresses such as are provided by auger extrusion. Through that expedient satisfactory adsorbents may be made alone from basic calcium phosphate at least as alkaline as hydroxyapatite or from plasticized mixtures of the basic calcium phosphate, clay, such as fuller's earth, and carbonizable material, such as starch. For example, such a basic calcium phosphate is mixed with clay binder, carbonizable organic matter and water to plasticize it, the mixture is subjected to high intensity shear stresses and compacted to the desired density, suitably by auger extrusion, then formed into granules of appropriate size which are heated in the substantial absence of air to carbonize the organic matter and sinter, but not vitrify, the clay.

Products made as described in that application possess greater hardness and bulk density and are consistently of more uniform quality than when prepared otherwise, which renders them better adapted to sugar refinery use than the products of the aforesaid patent. At the same time the products of the application invention are at least equal in decolorizing power, ash removing power, and alkaline buffering power to those of the said patent. Moreover, and of particular importance, such products also possess a more favorable distribution of pore volume relative to pore radius than is possessed by natural bone char.

This is illustrated by graph 2 of Fig. 1 which represents data obtained from a synthetic bone char made in accordance with the aforesaid application. A synthetic basic calcium phosphate was made by the addition of an aqueous solution of a water soluble phosphate to an aqueous suspension of lime, the acid being added at a rate such that the suspension was continuously alkaline. The proportions of soluble phosphate and lime were such that the basic phosphate precipitated was more alkaline than hydroxyapatite. The precipitated phosphate was filtered from the liquor and washed to remove water soluble impurities. 65 parts by weight of the basic phosphate, 20 parts by weight of Attapulgite clay and 15 parts of starch were plasticized with 57 parts of water, and the mixture of them was auger extruded. After drying the extrudate was crushed and screened and the sized product was heated to approximately 1100° F. in the substantial absence of air.

Inspection of graph 2, Fig. 1, shows that, in comparison with natural bone char, this synthetic char has relatively little volume in small pores and much greater volume in larger pores. For example, at 100 A. radius the pore volume increment per Angstrom for the synthetic product is approximately 0.004/0.00126, or approximately 3.18 times as great as for the natural bone char.

The data for the graphs of Fig. 1 may be used to compute cumulative pore volume from which the pore radius $r$ in Angstroms is plotted against the area in square meter per gram for pores of radius equal to or larger than $r$. When that is done it is found as appears from Fig. 2, that natural bone char graph 1a, and the basic calcium phosphate composition, graph 2a, both have about 70 square meters of area per gram of char in pores of 30 Angstrom or greater radius. However, the bone char has considerably more pores of less than 30 A. radius than does the phosphate composition, which it will lose relatively rapidly in service because these small pores will become clogged with residual impurities in a few cycles of use and reactivation. For all pore radii greater than 30 A. the phosphate composition of graph 2a is similarly shown to possess a greater total area in pores equal to or larger than 100 A. Actually, these cumulative pore area curves show that the composition of graph 2a has about 2.6 times as much area in pores larger than 100 A. than does the natural bone char. Consequently, the synthetic char of the aforesaid application should retain its effective area longer than bone char. Full scale experience in sugar refinery work has shown this to be the case. Thus, under comparable conditions the loss in area by bone char was approximately 4.5 times as great as the loss in area by the synthetic char.

Despite the improved character of basic calcium phosphate products at least as basic as hydroxyapatite made in accordance with the aforesaid application and patent, and their superiority to natural char, still better pore volume distribution would be desirable, i. e., a greater proportion of pores of more than 100 A. radius.

A primary object of the present invention is to provide basic calcium phosphate compositions at least as alkaline as hydroxyapatite having the properties that adapt products made in accordance with the foregoing patent and application to sugar refining but characterized by greatly improved distribution of pore volume to pore radius, and which can be produced readily and easily and at no appreciably greater expense than the products of the said patent and application.

Another object is to provide a method of producing compositions in accordance with the foregoing object and which is simple, easily and inexpensively practiced, and is applicable to provide such basic calcium phosphate compositions in accordance with the methods of the aforesaid patent and application without alteration of the necessary equipment or in the processing.

Other objects will appear from the following description.

The present invention is predicated upon my discovery that the incorporation of activated carbon during the making of products under the aforesaid patent and application has the unexpected effect of shifting the distribution of pore volume from pores of smaller radius toward those of larger radius. Powdered activated carbons are recognized as having exceedingly small pores. Consequently, it would be expected that the use of powdered activated carbon in making the compositions of the said patent and application would actually shift the pore volume maximum toward lower radius values and thus would have an adverse effect, particularly where the product would be intended for repeated use and reactivation. Actually, and unpredictably, however, the reverse effect obtains and is presently unexplainable.

The actual effect may be seen from graph 3 of Fig. 1. This represents the data for a composition made in the same way as that of graph 2 except that 15 parts of the powdered activated carbon sold by the Darco Department of Atlas Powder Co., Wilmington, Del., under the trademark "Darco S-51" was substituted for the starch used in making the char of graph 2. Inspection of graph 3 shows that the effect of this compositional change is indeed unpredictable and complicated. The curve in this case is trimodal, with maxima at about 6 A., 80 A. and 130 A. It is believed that the maximum at 6 A. is caused by the small pores of the carbon itself. The second, at 80 A., is due to the attapulgite binder, as has been determined by similar measurements made on the attapulgite alone. The third maximum represents the extraordinary shift in pore volume distribution that is evidently caused in some unknown manner by the presence of the fine pored carbon.

The practical significance of these results is shown by a comparison of the cumulative area data of Fig. 2 for the composition of this invention with the same data for those of the other two adsorbents. For all radii greater than 40 A. the composition of graph 3a, of this invention has a larger total area than the chars of either graph 1a or graph 2a. And in pores of 100 A. radius or larger, adsorbent 3a of this invention has almost twice as much area as adsorbent 2a, and more than four times as much area as natural bone char. At the same time, the composition of this invention possesses the hardness, density, ash and color removing powers, and buffering power necessary in a substitute for natural bone char.

In the practice of the invention the basic calcium phosphate compositions may be made as described in the aforesaid patent and application. The powdered active carbon of the present invention may be used in addition to the starch or other carbonizable organic matter or it may replace the starch in whole or in part. In practice under the aforesaid application, which is the preferred practice of the present invention, the basic calcium phosphate at least as alkaline as hydroxyapatite is mixed with the activated carbon, with or without starch or other carbonizable organic matter, the clay binder, and water to plasticize the mixture which is then extruded under high shearing stress in accordance with the invention of that application, followed by drying, pelletizing and burning to sinter the binder. The proportions of phosphate, clay and carbonizable matter may be as described in the said patent and application, due adjustment being made for the active carbon of this invention.

Although in the example given above there was used 15 per cent of activated carbon, in general there may be used for the purposes of the invention from about 5 to about 25 per cent by weight depending upon the exact pore volume relationships desired and the characteristics of the particular active carbon.

In hydroxyapatite the $CaO:P_2O_5$ ratio is 1.318:1. As indicated above, the basic calcium phosphate used in the practice of this invention is at least as alkaline as hydroxyapatite. Preferably the $CaO:P_2O_5$ ratio is approximately 1.4:1.

According to the provisions of the patent statutes, I have explained the principle and mode of practicing my invention and have illustrated and described what I now consider to represent its best embodiment. However, I desire to have it understood that, within the scope of the appended claims, the invention may be practiced otherwise than as specifically illustrated and described.

I claim:

1. In a method of making an adsorbent the steps comprising forming an intimate plastic mixture comprising basic calcium phosphate at least as alkaline as hydroxyapatite, clay, powdered active carbon, and water, forming said mixture into shapes, and heating the shapes in substantial absence of air to harden them at a temperature below that at which said clay vitrifies.

2. A method according to claim 1, said mixture containing about 5 to 25 per cent of said active carbon.

3. In a method of making an adsorbent, the steps of subjecting a liquid plasticized mixture comprising basic calcium phosphate at least as alkaline as hydroxyapatite, clay, and powdered active carbon to high intensity shearing stresses, then drying the thus-treated material, and heating the dried material in the substantial absence of air at a temperature below that at which said clay vitrifies to render the material mechanically strong.

4. A method according to claim 3 in which said stresses are applied by high pressure auger extrusion.

5. A method according to claim 4, said water plasticized mixture containing about 5 to 25 per cent carbon.

6. A method according to claim 3, said clay being an attapulgite.

7. A method according to claim 3, said phosphate having a $CaO:P_2O_5$ ratio of about 1.4:1.

8. In a method of making an adsorbent, the steps comprising adding to an agitated alkaline suspension of lime, clay and about 5 to 25 per cent of active carbon in water reactive phosphate at a rate such that the solution remains alkaline to form an intimate mixture of clay, carbon and basic calcium phosphate at least as alkaline as hydroxyapatite, filtering and washing the filter cake free from water soluble matter, then adding water to provide a plastic mix, subjecting the plastic material to high intensity shearing stresses then forming granules from the mixed material, drying the granules, and heating the dried material in substantial absence of air, to render it mechanically strong, at a temperature below that at which said clay vitrifies.

9. A method according to claim 8, said phosphate having a $CaO:P_2O_5$ ratio of about 1.4:1.

10. In a method of making an adsorbent the steps comprising forming an intimate plastic mixture comprising basic calcium phosphate at least as alkaline as hydroxyapatite, clay, starch, powdered active carbon, and water, forming said mixture into shapes, and heating the shapes in substantial absence of air to harden them at a temperature below that at which said clay vitrifies.

11. A method according to claim 10 in which said forming is done by hight pressure auger extrusion.

12. In a method of making an adsorbent, the steps comprising adding to an agitated alkaline suspension of lime, clay, starch, and about 5 to 25 per cent of active carbon in water reactive phosphate at a rate such that the solution remains alkaline to form an intimate mixture of clay, starch, carbon and basic calcium phosphate at least as alkaline as hydroxyapatite, filtering and washing the filter cake free from water soluble matter, then adding water to provide a plastic mix, mixing the plastic material by high intensity shearing stresses and forming granules from the mixed material, drying the granules, and heating the dried material in substantial absence of air, to render it mechanically strong, at a temperature below that at which said clay vitrifies.

13. Heat hardened granular adsorbent material comprising up to about 50 per cent of clay, up to about 25 per cent of active carbon, and the remainder substantially all basic calcium phosphate at least as alkaline as hydroxyapatite, the granules being substantially homogeneous physically, having hardness and density at least approximating natural virgin bone char, and having at least about four times as much area per unit weight as said char.

14. Adsorbent according to claim 13, said phosphate having a $CaO:P_2O_5$ ratio of about 1.4:1, weight basis.

15. Adsorbent according to claim 14, said clay being an attapulgite.

References Cited in the file of this patent

UNITED STATES PATENTS

| | | |
|---|---|---|
| 1,628,206 | Weiss et al. | May 10, 1927 |
| 1,868,565 | Connolly | July 26, 1932 |
| 1,998,626 | Koenig | Apr. 23, 1935 |
| 2,057,433 | Ipatieff | Oct. 13, 1936 |
| 2,079,854 | Hartshorne | May 11, 1937 |
| 2,210,148 | Indest | Aug. 6, 1940 |
| 2,352,932 | Barrett et al. | July 4, 1944 |